(No Model.) 2 Sheets—Sheet 1.

M. W. DEWEY.
METHOD OF EXPANDING HOOPS OR TIRES.

No. 402,416. Patented Apr. 30, 1889.

WITNESSES:
J. J. Laass
C. L. Bendixon

INVENTOR
Mark W. Dewey
BY
Dudly, Laass & Dudl
ATTORNEYS (No Model.) 2 Sheets—Sheet 2.

M. W. DEWEY.
METHOD OF EXPANDING HOOPS OR TIRES.

No. 402,416. Patented Apr. 30, 1889.

WITNESSES:
J. J. Laass
C. L. Bendixon

INVENTOR
Mark W. Dewey
BY
Duell, Laass & Duell
ATTORNEYS

UNITED STATES PATENT OFFICE.

MARK W. DEWEY, OF SYRACUSE, NEW YORK, ASSIGNOR, BY DIRECT AND MESNE ASSIGNMENTS, TO THE DEWEY CORPORATION, OF SAME PLACE.

METHOD OF EXPANDING HOOPS OR TIRES.

SPECIFICATION forming part of Letters Patent No. 402,416, dated April 30, 1889.

Application filed February 11, 1889. Serial No. 299,401. (No model.)

*To all whom it may concern:*

Be it known that I, MARK W. DEWEY, of Syracuse, in the county of Onondaga, in the State of New York, have invented new and useful Improvements in the Method of Expanding Hoops or Tires, of which the following, taken in connection with the accompanying drawings, is a full, clear, and exact description.

My invention relates to a method or process of temporarily expanding metallic hoops or tires preparatory to applying the same to a body to be encompassed and bound thereby.

The objects of my invention are to provide a rapid and reliable method of heating evenly and to any desired temperature metallic hoops or tires and thereby expanding the same; and to that end my invention consists, essentially, in the method of expanding hoops or tires by subjecting the same to an electric current of large volume circulating uniformly within the entire circumference thereof. The heating-current may be generated, conducted, and regulated, and, when necessary, transformed, by any suitable means known in the art or by electricians.

By the ordinary method of expanding hoops or tires by heat from the combustion of fuel the said hoops or tires are seldom heated evenly, but in several places around the same, and often each place separately; or, when heated in a furnace, sometimes only one side of the tire will be heated, which causes the same to warp and twist, which is a great objection. When the tire or hoop cannot be heated evenly, it is necessary to heat some parts thereof excessively in order to sufficiently expand the same, and consequently the metal is apt to be burned and its strength, hardness, and durability impaired. The old methods are also objectionable, because they are slow and tedious.

Figure 1:
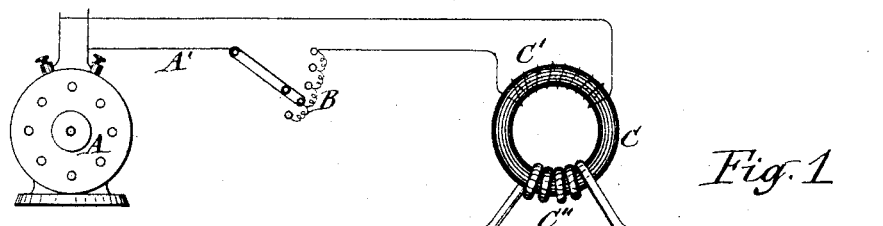
Figure 2:
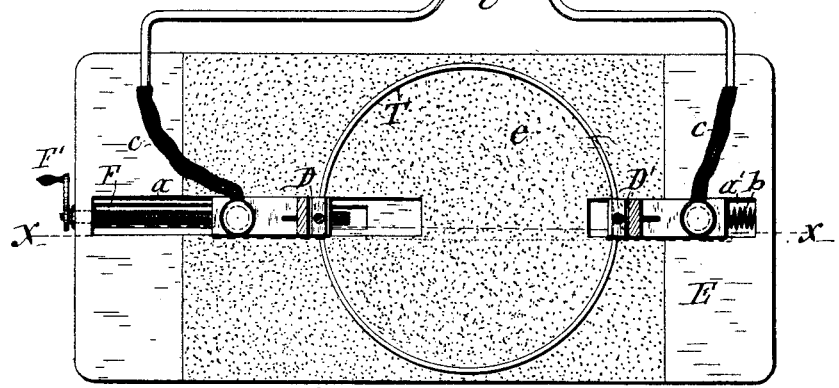
Figure 3:
Figure 4:
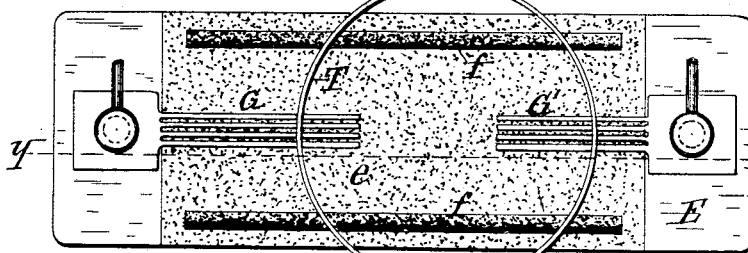
Figure 5:
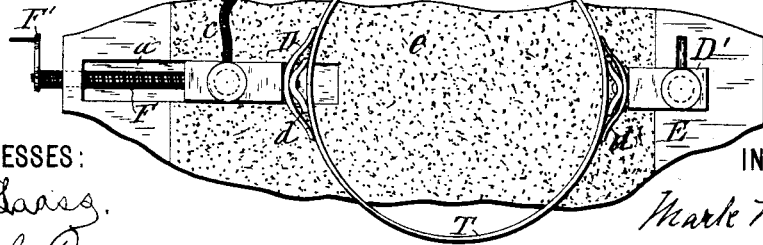
Figure 6:
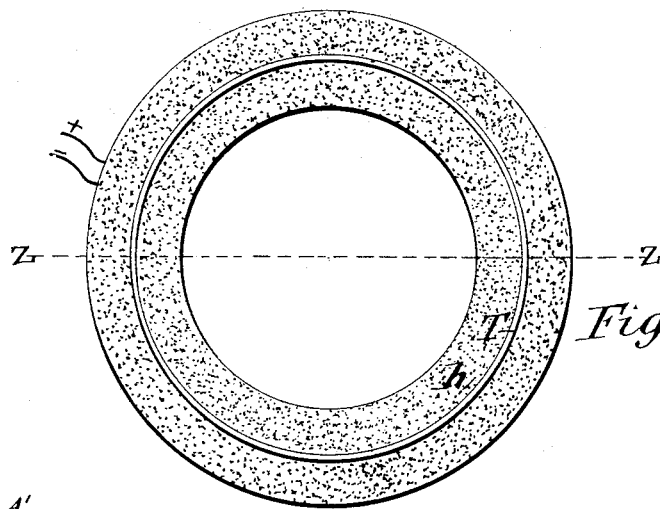
Figure 7:
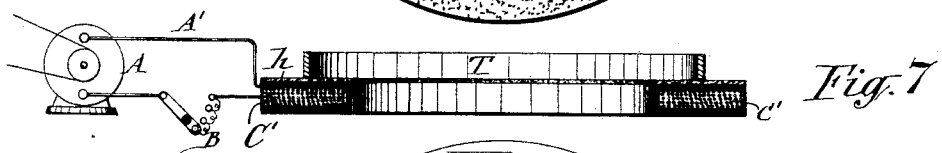
Figure 8:
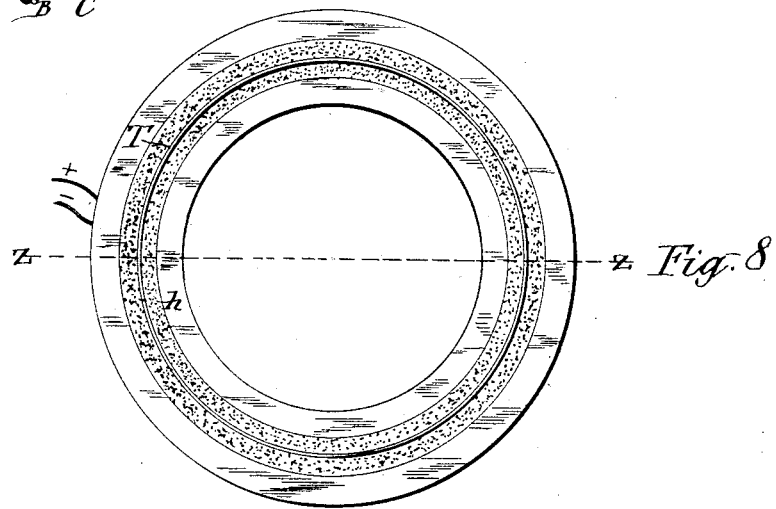
Figure 9:
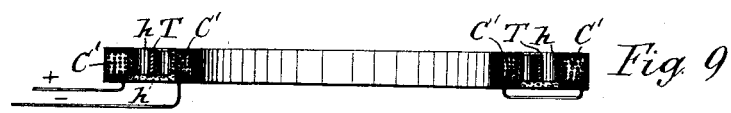

In the accompanying drawings, Figure 1 is a plan view taken below the line $w$ $w$ of Fig. 2, showing an apparatus with a source of electricity connected thereto for carrying out my invention. Fig. 2 is a vertical longitudinal section on line $x$ $x$ of Fig. 1. Fig. 3 shows a plan of another form of the apparatus; Fig. 4, a section of the same on line $y$ $y$. Fig. 5 illustrates a plan of another form. Fig. 6 is a plan view of an expanding apparatus, in which the tire alone forms the circuit for the heating-current. Fig. 7 is a section on line $z$ $z$ of Fig. 6, and Figs. 8 and 9 are modifications of the devices shown in Figs. 6 and 7.

Referring to Figs. 1 and 2 specifically, A in Fig. 1 represents an alternating-current generator; A', the circuit leading therefrom, including an adjustable resistance, B, to regulate the strength of the current in the coil C', wound around an annular iron core, C. The coil C'' on the same core is the coil of the secondary circuit through which the heating-current flows. The primary circuit A' is formed of small wire, and the coil C' has many convolutions. The secondary coil C'' is of large wire or cable and has but a few convolutions. The core C, with its coils of small and large wires C' and C'', constitute an inductional transformer usually employed to convert high-tension currents of small quantity into low-tension currents of great quantity to produce a great heating effect.

The terminals of the secondary coil are connected by flexible low-resistance conductors $c$ with movable and adjustable clamps D and D', of very good conducting material. These clamps D and D' are attached to the tire and are adapted to hold the hoop or tire T so as to make good electric contact with the same at two points equidistantly apart in the circumference of the tire, so that the resistance of said tire will be equally divided between the two clamps to form two paths for the currents. The object of thus equally distributing the clamps on the hoop or tire is to heat the same uniformly throughout its circumference, for if the clamps were applied to the tire so that a short portion of the same was between the clamps on one side and a long portion on the other side, and if the tire were of a uniform size in cross-section throughout, a greater part of the current would pass through the short portion on account of its small resistance compared to the long portion, and consequently would heat the short portion more than the long portion in proportion to the difference of resistance in the two portions of the tire. If a small difference of resistance exists between the two portions, however, the difference of heat in the two parts may be nearly imperceptible and immaterial.

E is a table or base covered partly with suitable non-conducting material, e—such as asbestos or fire-clay—upon which the tire lies when clamped. This insulation is unnecessary, of course, when the clamps or contacts sustain the tire T slightly above the base E, allowing an air-space between said tire and base. The clamps are insulated from each other and movable toward and from each other in slots or guides $a$ and $a'$ in the base. One of the clamps, D', is backed by a spring, $b$, which yieldingly sustains it in its position. The other clamp, D, is adapted to be moved a considerable distance by a screw, F, to permit tires of different diameters to be placed between the clamps.

The operation of this apparatus is as follows: The clamp D having been separated far enough from the clamp D' by turning the screw F by means of the crank F' to permit the tire T to be placed between the clamps, the contacts $d$ and $d'$ of said clamps are screwed down upon the edges of the tire to make good electric contact. Then the primary circuit is closed and regulated by moving the switch of the adjustable resistance B. When the tire is sufficiently heated, the said switch may be opened to break the circuit, or allowed to remain closed, and the secondary circuit broken by loosening or unscrewing the contacts or by a suitable circuit maker and breaker (not shown) in either the primary or secondary circuit. Then the tire is removed and the apparatus is in position to receive another tire of the same size; but if the next tire is of a different size the clamp D may be readily moved in either direction, according to the size of the tire, by means of the screw F, as before.

The apparatus shown in Figs. 3 and 4 is similar to that shown in Figs. 1 and 2, except that in place of movable clamps D and D' stationary contact-springs G and G' are employed, upon which the tire T is laid, the weight of the tire upon the springs being sufficient to make good contact between the parts. This form is specially adapted for very rapid work, as it is only necessary to lay the tire upon the spring-contacts, as shown in the figures, and to remove the same when sufficiently heated without having to move or adjust clamps of any sort. $f f$ are ribs of suitable insulation, holding the said tire slightly above the table E in addition to the insulation $e$, or the latter may be dispensed with. The terminals of the secondary coil C'' may be directly connected to the stationary springs G and G' without employing the flexible conductors $c\ c$.

The apparatus shown in Fig. 5 is also similar to that shown in Fig. 1. In this case, however, one of the clamps or clamp-blocks, D', is stationary and the other, D, is movable. The contacts $d$ and $d'$ of the clamps are springs which bear on the periphery of the tire when in position between the clamps, and the clamp D is moved toward the other clamp by means of the screw F. The spring-contacts are flexible enough to permit the expansion of the tire, make good contact with the same, and are adapted for rapid work. In Figs. 6 and 7 the primary coil C' of the transformer is made as large as the tire, or large enough to form a bed to support various sizes of tires. Suitable insulating and heat-non-conducting material, $h$, such as hereinbefore mentioned, is interposed between the coil C' and tire T, which latter forms the secondary coil C''. Said insulation is employed for the purpose of preventing the heat of the tire from burning the insulation around the wire of the coil C' when it is of fusible material. As the tire alone forms the secondary circuit, the heating-current circulates only in said tire, and the other parts forming the secondary circuit in the other apparatuses are dispensed with, and the apparatus is thus greatly simplified. The heat in the tire may be controlled by suitable controlling devices in the primary circuit A' or by varying the distance between the tire to be heated and the primary coil by any suitable means.

Figs. 8 and 9 show modications of the apparatus shown in Figs. 6 and 7, the only difference being that the primary coil C', instead of being entirely underneath the tire, is in this case divided, one part being placed within the tire and the other around on the outside thereof. Similar insulation is provided to protect the insulation around the wire of the coil, as before mentioned, and the current or heat in the tire is regulated in the same manner. The contraction of the hoop or tire after being expanded may be hastened by the application of cold air, water, or other suitable cooling agencies.

Having described my invention, what I claim as new, and desire to secure by Letters Patent, is—

1. As a preliminary step in the process of setting hoops or tires, the within-described method of expanding said hoops or tires, consisting in suitably insulating the same and then subjecting the hoops or tires to the heating effect of an electric current, as set forth.

2. The method of heating hoops or tires, consisting in bringing in contact therewith at points diametrically opposite each other the terminals of a low-resistance supply-conductor and passing an electric current of large volume through said conductor and hoop or tire, substantially as set forth.

3. The method of expanding a hoop or tire preparatory to setting the same, consisting in circulating uniformly or substantially uniformly within the entire circumference thereof an electric current of large volume, as set forth.

In testimony whereof I have hereunto signed my name this 8th day of February, 1889.

MARK W. DEWEY. [L. S.]

Witnesses:
   C. H. DUELL,
   A. F. WALZ.